United States Patent [19]
Kim

[11] Patent Number: 5,978,659
[45] Date of Patent: Nov. 2, 1999

[54] RADIO CHARACTERISTIC EVALUATING APPARATUS OF MOBILE TELECOMMUNICATION DEVICE

[75] Inventor: Yong-Il Kim, Euiwang, Rep. of Korea

[73] Assignee: SamSung Electronics Co., Ltd., Kyungki-do, Rep. of Korea

[21] Appl. No.: 08/775,096

[22] Filed: Dec. 30, 1996

[30] Foreign Application Priority Data

Dec. 30, 1995 [KR] Rep. of Korea ...................... 95/67866

[51] Int. Cl.⁶ .................................................. H04Q 7/34
[52] U.S. Cl. ......................................... 455/67.1; 455/423
[58] Field of Search .................................. 455/67.1, 423, 455/424, 425

[56] References Cited

U.S. PATENT DOCUMENTS

| | | | |
|---|---|---|---|
| 5,425,076 | 6/1995 | Knippelmier | 455/424 |
| 5,490,288 | 2/1996 | Wiatrowski | 455/423 |
| 5,768,260 | 6/1998 | Lindgren et al. | 455/423 |

*Primary Examiner*—Dwayne D. Bost
*Assistant Examiner*—Myron K. Wyche
*Attorney, Agent, or Firm*—Robert E. Bushnell, Esq.

[57] ABSTRACT

A radio characteristic evaluating apparatus of a mobile telecommunication device. The radio characteristic evaluating apparatus of the mobile telecommunication device includes: a first terminal of a measuring sample; a second terminal of a measured sample; a radio mode conversion jig for maintaining a talking state by setting a call between the first and second terminals, for converting transmitting and receiving modes according to a radio characteristic evaluation test, and for attenuating a level of a talking path on the basis of a level setting of the talking path necessary for a receiving test; a control terminal device for controlling a call setting of the radio mode conversion jig, the conversion of the transmitting and receiving modes and the level setting of the talking path on the basis of the manipulation of a user according to each measuring item and a specified value, for controlling the second terminal so as to attempt a call, and for managing a result of the radio characteristic evaluation test under the talking state; and transmitting and receiving testers for measuring transmitting and receiving radio characteristic evaluation tests according to the conversion of the transmitting and receiving modes of the radio mode conversion.

13 Claims, 2 Drawing Sheets

RADIO CHARACTERISTIC EVALUATING APPARATUS OF MOBILE TELECOMMUNICATION DEVICE

CLAIM OF PRIORITY

This application makes claims all benefits accruing under 35 U.S.C. §119 from an application for RADIO CHARACTERISTIC EVALUATING APPARATUS OF MOBILE TELECOMMUNICATION DEVICE earlier filed in the Korean Industrial Property Office on Dec. 30, 1995 and there duly assigned Ser. No. 67866/1995.

BACKGROUND OF THE INVENTION

1. Field of the Invention

The present invention relates to a radio characteristic evaluating apparatus of a mobile telecommunication device and, more particularly, to an apparatus for evaluating a radio characteristic by changing a mode according to a measuring item.

2. Description of the Related Art

Although there is a slight difference between methods for evaluating a radio characteristic according to the standardization of a mobile telecommunication device, such as a CT-2 (Cordless Telephone-2), a PHS (Personal Handphone System), a GSM (Global System for Mobile Telecommunication), etc., the mobile telecommunication device (a terminal or a base station) should be evaluated after a call is set, that is, while a communication state is maintained. However, since the construction of a talking path for an air interface should sufficiently consider environmental shielding, it is not easy to evaluate the mobile telecommunication device by such a basic method.

Currently, the radio characteristic of the mobile telecommunication device is being evaluated not through a call setting between the telecommunication devices at a radio state but through a discrete instrument or through an integrated instrument controlled by RS-232C from a jig. That is, most of the current instrument for evaluating the mobile telecommunication device has a GP-IB card and can automatically measure the radio characteristic of samples by interlocking each element by the control of a personal computer.

However, although the above-described radio characteristic evaluating method can be effectively and rapidly used in a transmitting and receiving unit test or a board test, it is not appropriate as the radio characteristic evaluating method for a finished product of the mobile telecommunication device.

SUMMARY OF THE INVENTION

It is an object of the present invention to provide a radio characteristic evaluating apparatus for rapidly and accurately evaluating a radio characteristic of a mobile telecommunication device.

It is another object of the present invention to provide an apparatus for evaluating a radio characteristic for a finished product of a mobile telecommunication device.

It is still another object of the present invention to provide a radio characteristic evaluating apparatus for facilitating the management and output of radio characteristic evaluated data.

In accordance with the present invention, a mutual call is set at a state of a finished product without modifying a measuring sample or interlinking the measuring sample with a jig, and a radio talking path is changed to transmitting and receiving modes according to a measuring item, thereby evaluating a radio characteristic of a mobile telecommunication device. To this, a radio mode conversion jig sufficiently performs the environmental shielding (electromagnetic shielding) when constructing the talking path necessary for transmitting and receiving tests and changes its mode according to the measuring item.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
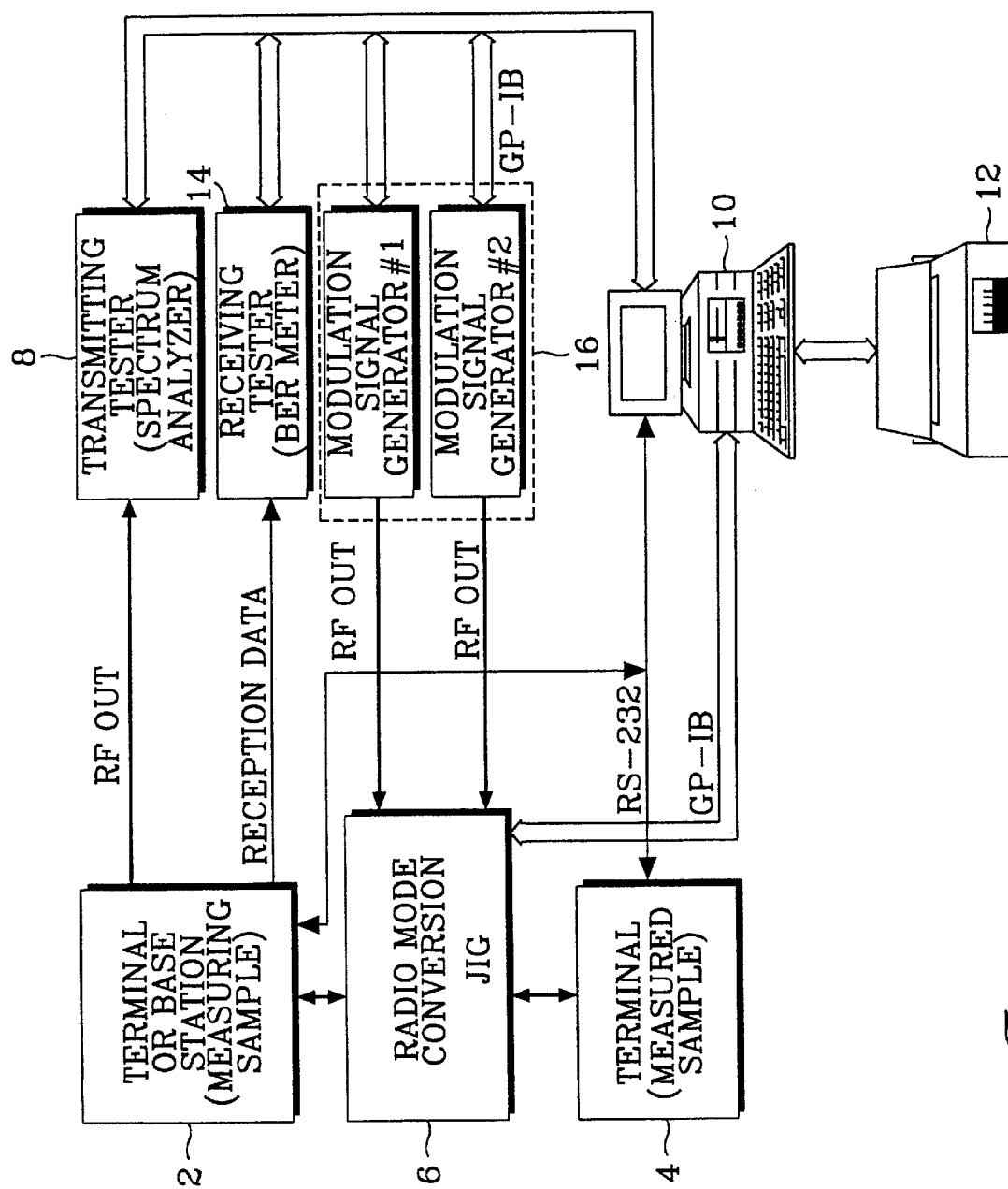
FIG. 1 is a block diagram of a radio evaluating apparatus using a radio mode conversion jig according to the present invention.

Referring to FIG. 1, a talking state is maintained by setting a call through a radio mode conversion jig 6 between a measuring sample terminal 2 (or a base station) and a measured sample terminal 4, and transmitting and receiving modes are converted according to a radio evaluating test. A talking path level setting necessary for a receiving test is automatically programmed in the radio mode conversion jig 6 by a GP-IB IEEE std. 488 command controlled by a personal computer (PC) 10. The transmitting and receiving modes are controlled through a GP-IB. A transmitting tester 8 and a receiving tester 14 are set through the GP-IB according to each measuring item and a specified value.

In setting the call between the measuring sample terminal 2 and the measured sample terminal 4, the call is attempted from the measured sample terminal 4 through RS-232C by the PC 10 and carried out through the radio mode conversion jig 6. Under such a talking state, a result of evaluating a radio characteristic is also managed by the PC 10 through the GP-IB. A printer 12 prints the result by the control of the PC 10.

The construction shown in FIG. 1 can obtain an accurate characteristic since there is no need to additionally change and control the measuring sample terminal 2 even though it is a finished product. In this case, an antenna of the measuring sample terminal 2 should be changed to a connector type so as to directly connect the transmitting tester 8 to a coaxial cable. During the receiving test, since receiving data is evaluated on the basis of bit error rate (BER), additional receiving data should be connected to the receiving tester 14.

Figure 2:
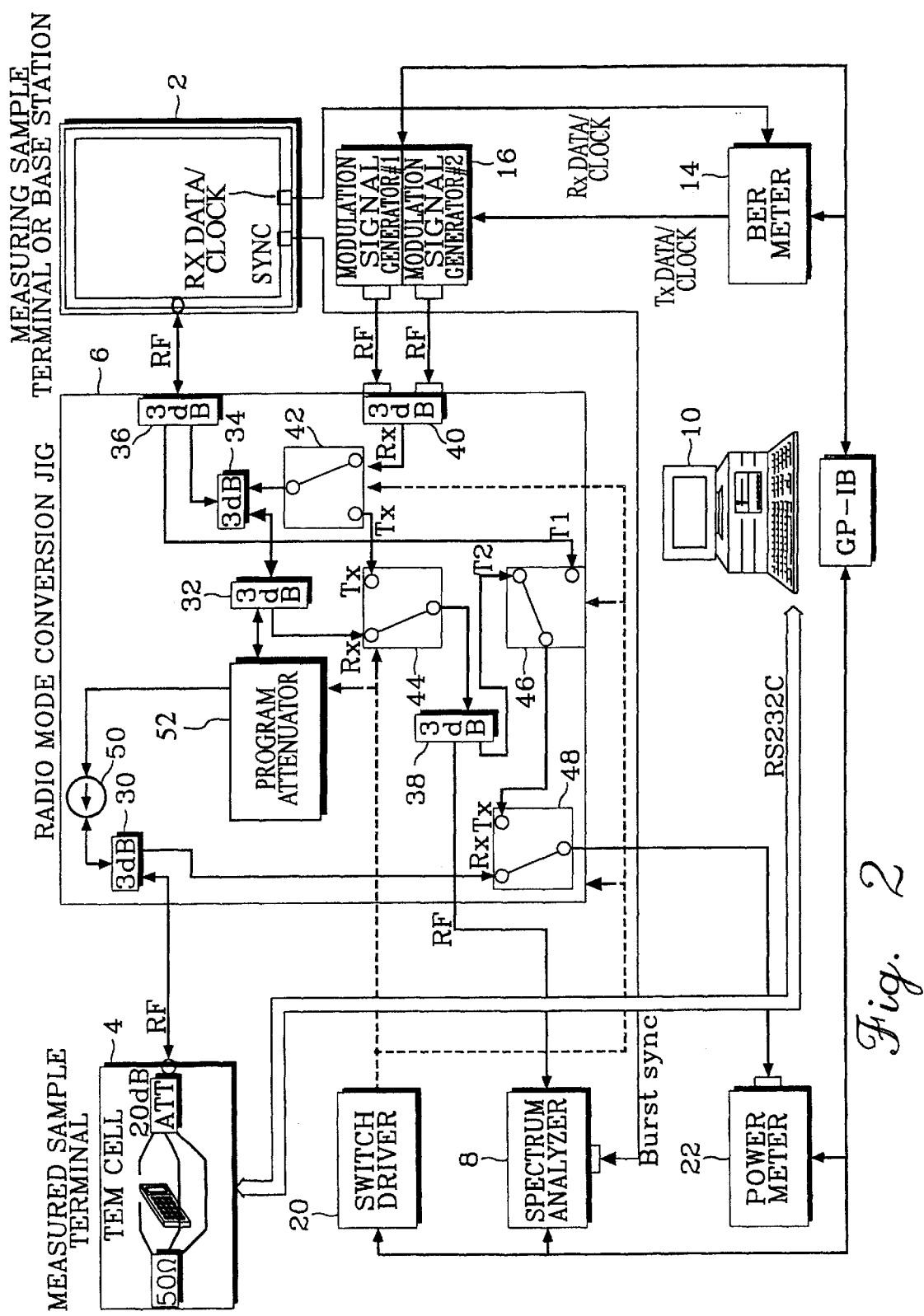
FIG. 2 is a detailed block diagram of FIG. 1 and shows radio mode conversion and peripheral interlinking relationship.

FIG. 2 is a detailed block diagram of FIG. 1 and shows the radio mode conversion and peripheral interlinking relation. The call between the mobile telecommunication devices is maintained through the radio mode conversion jig 6 between the measured sample terminal 4 and the measuring sample terminal 2. The mode conversion of the radio mode conversion jig 6 and the loss of the talking path are controlled through a switch driver 20 by using the GP-IB IEEE std. 488 command. A spectrum analyzer 8 corresponding to the transmitting tester 8 shown in FIG. 1 is utilized for testing a transmitting characteristic and receives a burst synchronization signal in order to evaluate the mobile telecommunication device of time duplexing domain specification which is a radio connecting system.

Generally, the receiving sensitivity is evaluated by the bit error rate (BER). A modulation signal generator 16 digitally modulates transmitting (Tx) data and a clock generated from a BER meter 4 corresponding to the receiving tester shown in FIG. 1 and causes the measuring sample terminal 2 interlinked therewith through the talking path (radio mode conversion jig 6) to supply receiving (Rx) data to the BER meter 14. The BER meter 14 compares the transmitting data with the receiving data and displays a compared result by the BER. The displayed BER corresponds to the receiving sensitivity. In evaluating a receiving interference signal characteristic, the BER meter 14 can evaluate whether the measuring sample terminal 2 satisfies an interference level of a specified value by use of the modulation signal generator 16.

In operation, mode conversion switches 42, 44, 46 and 48 within the radio mode conversion jig 6 are switched by the switch driver 20 on the basis of the transmitting and receiving mode conversion of the PC 10 through the GP-IB.

During a transmitting test, the mode conversion switches 42 and 44 are converted to the transmitting mode. Therefore, the transmitting state of the measuring sample terminal 2 is evaluated through the spectrum analyzer 8. During the receiving test, the mode conversion switch 42 is converted to the receiving mode. Hence, the receiving characteristic of the measuring sample terminal 2 is evaluated through the BER meter 14. The mode conversion switches 46 and 48 are used for transmitting a loss value of the talking path to a power meter 22. The power meter 22 detects the loss value of the talking path and supplies the detected loss value to the spectrum analyzer 8. The spectrum analyzer 8 compensates an offset level for the loss value of the talking path. In this case, the mode conversion switch 48 is in a state switched to the transmitting (Tx) mode.

To detect the loss value of the talking path during reception, the mode conversion switch 48 is converted to the receiving (Rx) mode. The modulation signal generator 16 compensates the offset level for the loss value of the talking path. A program attenuator 52 is driven by the switch driver 20 and used for evaluating the receiving sensitivity and a receiving electric filed strength level under the direct link state between the measured sample terminal 4 and the measuring sample terminal 2. The switch driver 20 receives the talking path level necessary for the receiving test by the GP-IB IEEE std. 488 command controlled by the PC 10 and drives the program attenuator 52. An isolator 50 connected between the program attenuator 52 and the measured sample terminal 4 isolates a radio frequency level received from the measured sample terminal 4 in order to accurately evaluate the radio characteristic of the measuring sample terminal 2. Reference numerals 30, 32, 34, 36, 38 and 40 within the radio mode conversion jig 6 indicate pads of 3 dB.

As described above, an instrument is automatically interlocked so that the radio characteristic evaluating apparatus can be applied to the development and mass production. Therefore, the radio characteristic can be rapidly and accurately measured, and data management and output can be facilitated.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for evaluating a radio characteristic of a mobile telecommunication device, comprising:

a first terminal of a measuring sample;

a second terminal of a measured sample;

a radio mode conversion jig for maintaining a talking state by setting a call between said first and second terminals, for converting transmitting and receiving modes according to a radio characteristic evaluation test, and for attenuating a level of a talking path on the basis of a level setting of the talking path necessary for a receiving test;

a control terminal device for controlling a call setting of said radio mode conversion jig, the conversion of said transmitting and receiving modes and the level setting of the talking path on the basis of the manipulation of a user according to each measuring item and a specified value, for controlling said second terminal so as to attempt a call, and for managing a result of said radio characteristic evaluation test under said talking state; and transmitting and receiving testers for measuring transmitting and receiving radio characteristic evaluation tests according to the conversion of said transmitting and receiving modes of said radio mode conversion jig.

2. An apparatus for evaluating a radio characteristic of a mobile telecommunication device as claimed in claim 1, wherein said control terminal device controls said radio mode conversion jig and said transmitting and receiving testers by using a GP-IB IEEE std. 488 command.

3. An apparatus for evaluating a radio characteristic of a mobile telecommunication device as claimed in claim 1, wherein said control terminal device controls said second terminal through RS-232C.

4. An apparatus for evaluating a radio characteristic of a mobile telecommunication device as claimed in claim 1, further comprises a printer for printing a result of said radio characteristic evaluation test by the control of said control terminal device.

5. An apparatus for evaluating a radio characteristic of a mobile telecommunication device as claimed in claim 1, wherein said first terminal has an antenna of a connector type so as to directly connect said transmitting tester to a coaxial cable.

6. An apparatus for evaluating a radio characteristic of a mobile telecommunication device, comprising:

a base station device of a measuring sample;

a measured sample terminal;

a radio mode conversion jig for maintaining a talking state by setting a call between said base station device and said measured sample terminal, for converting transmitting and receiving modes according to a radio characteristic evaluation test, and for attenuating a level of a talking path on the basis of a level setting of the talking path necessary for a receiving test;

a control terminal device for controlling a call setting of said radio mode conversion jig, the conversion of said transmitting and receiving modes and the level setting of the talking path on the basis of the manipulation of a user according to each measuring item and a specified value, for controlling said measured sample terminal so as to attempt a call, and for managing a result of said radio characteristic evaluation test under said talking state;

transmitting and receiving testers for measuring transmitting and receiving radio characteristic evaluation tests according to the conversion of said transmitting and receiving modes of said radio mode conversion jig; and a printer for printing a result of said radio characteristic evaluation test by the control of said control terminal device.

7. An apparatus for evaluating a radio characteristic of a mobile telecommunication device, comprising:

a base station to be evaluated according to its transmitting and receiving characteristics;

a measured sample terminal for making a call to said base station;

a radio mode conversion jig coaxially connected between said measured sample terminal and said base station device for maintaining a talking state between said base station device and said measured sample terminal, for changing between a transmitting mode and a receiving mode according to a radio characteristic evaluation test, and for attenuating a level of a talking path on the basis of a level setting of the talking path necessary during a receiving test of said base station device;

a control terminal device for controlling a call setting of said radio mode conversion jig, the changing between said transmitting and receiving modes and the level setting of the talking path on the basis of the manipulation of a user according to each measuring item and a specified value, for controlling said measured sample terminal so as to attempt a call, and for managing a result of said radio characteristic evaluation test under said talking state;

a spectrum analyzer for measuring transmitting radio characteristic evaluation tests according to the change of said radio mode conversion jig to said transmitting mode;

a power meter for detecting a loss value in said talking path during the receiving mode and transmitting said loss value to said spectrum analyzer during said transmitting mode;

a bit error rate meter for measuring a receiving radio characteristic evaluation test according to the change of said radio mode conversion jig to said receiving mode; and a modulation signal generator for digitally modulating transmitting data generated from said bit error rate meter to cause the base station device, interlinked therewith through the talking path via said radio mode conversion jig, to supply receiving data to said bit error rate meter.

8. An apparatus for evaluating a radio characteristic of a mobile telecommunication device as claimed in claim 1, wherein said radio mode conversion jig comprises a program attenuator for attenuating the level of a talking path when evaluating a receiving sensitivity and a receiving electric filed strength level under a direct link state between the measured sample terminal and the base station device.

9. An apparatus for evaluating a radio characteristic of a mobile telecommunication device as claimed in claim 8, wherein said radio mode conversion jig further comprises:

a plurality of switches switchable between said transmitting mode and said receiving mode, said plurality of switches comprising:

a first switch having a common terminal coaxially connected to said base station device via a first 3 Db pad and second 3 Db pad connected in series, a reception mode terminal connected to said modulation signal generator via a third 3 Db pad and a transmission terminal connected to a transmission terminal of a second switch;

said second switch having a reception terminal coaxially connected to said base station device via a fourth 3 Db pad, said second 3 Db pad and said first 3 Db pad, said first, second and first 3 Db pads being connected in series, and a common terminal connected to a first input terminal of a third switch via a fifth 3 Db pad, said common terminal of said second switch being further connected to said spectrum analyzer via said fifth 3 Db pad;

said third switch having a second input terminal coaxially connected to said base station device via said first 3 Db pad and a common terminal connected to a transmission terminal of a fourth switch; and said fourth switch having a common terminal connected to said power meter and a reception terminal connected to said measured sample terminal via a sixth 3 Db pad; and an isolator connected between said program attenuator and said sixth 3 Db pad, wherein said program isolator is connected between said fourth 3 Db pad and said isolator.

10. An apparatus for evaluating a radio characteristic of a mobile telecommunication device as claimed in claim 9, wherein said control terminal device comprises a switch driver for controlling the switching of said plurality of switches and for driving said program attenuator on the basis of said level setting of the talking path.

11. An apparatus for evaluating a radio characteristic of a mobile telecommunication device as claimed in claim 10, wherein said control terminal device controls said radio mode conversion jig and said transmitting and receiving testers by using a GP-IB IEEE std. 488 command.

12. An apparatus for evaluating a radio characteristic of a mobile telecommunication device as claimed in claim 11, wherein said switch driver receives the talking path level necessary for the receiving test via said GP-IB IEEE std. 488 command.

13. An apparatus for evaluating a radio characteristic of a mobile telecommunication device as claimed in claim 9, wherein said isolator isolates a radio frequency level received from the measured sample terminal in order to accurately evaluate the radio characteristic of the base station device.

* * * * *